US009594645B2

(12) United States Patent
Akirav et al.

(10) Patent No.: US 9,594,645 B2
(45) Date of Patent: *Mar. 14, 2017

(54) PROTECTING DATA SEGMENTS IN A COMPUTING ENVIRONMENT

(71) Applicant: INTERNATIONAL BUSINESS MACHINES CORPORATION, Armonk, NY (US)

(72) Inventors: Shay H. Akirav, Petach-Tikva (IL); Elena Drobchenko, Raanana (IL); Itay Maoz, Haifa (IL); Gil E. Paz, Yehud (IL); Vadim Stotland, Petach-Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,511

(22) Filed: Mar. 29, 2016

(65) Prior Publication Data
US 2016/0210206 A1    Jul. 21, 2016

Related U.S. Application Data

(63) Continuation of application No. 13/801,449, filed on Mar. 13, 2013, now Pat. No. 9,311,325, which is a (Continued)

(51) Int. Cl.
*G06F 17/00* (2006.01)
*G06F 11/14* (2006.01)
(Continued)

(52) U.S. Cl.
CPC .......... *G06F 11/1471* (2013.01); *G06F 3/065* (2013.01); *G06F 3/0619* (2013.01);
(Continued)

(58) Field of Classification Search
CPC ......... G06F 17/30212; G06F 17/30587; G06F 17/30067
(Continued)

(56) References Cited

U.S. PATENT DOCUMENTS 7,788,361 B2 *   8/2010   sen Sarma ............. G06F 3/061
                                                          709/223
7,996,635 B2      8/2011   Kano
(Continued)

OTHER PUBLICATIONS

IBM System Storage TS7600 with ProtecTIER, User's Guide, Copyright International Business Machines Corporation 2008, 2009. 180 pages.*
(Continued)

*Primary Examiner* — Rehana Perveen
*Assistant Examiner* — Loc Tran
(74) *Attorney, Agent, or Firm* — Griffiths & Seaton PLLC

(57) ABSTRACT

Various embodiments for protecting data segments by a processor device in a computing environment, are provided. In one embodiment, a method comprises, if an error occurs during a replication operation from a source location to a destination location causing at least one of a plurality of data segments to be deleted in the source location, performing: executing a failback operation by a reverse replication process from the destination location to the source location, and regaining ownership of the data segments by the source location; and pursuant to the failback operation, performing: enabling the reverse replication process if an owner of the data segments is a designated one of the destination location, and adding an invalid owner notification in a history table, wherein the failback operation is identified for the designated one of the at least one destination location.

22 Claims, 15 Drawing Sheets

Related U.S. Application Data continuation of application No. 13/152,099, filed on Jun. 2, 2011, now Pat. No. 9,292,535.

(51) Int. Cl.
*G06F 17/30* (2006.01)
*G06F 3/06* (2006.01)

(52) U.S. Cl.
CPC .......... *G06F 3/0665* (2013.01); *G06F 3/0683* (2013.01); *G06F 3/0686* (2013.01); *G06F 11/1474* (2013.01); *G06F 17/30174* (2013.01); *G06F 17/30212* (2013.01); *G06F 17/30233* (2013.01); *G06F 2201/805* (2013.01); *G06F 2201/82* (2013.01); *G06F 2201/85* (2013.01)

(58) Field of Classification Search
USPC ........................................ 707/626, 633, 650
See application file for complete search history.

(56) References Cited

U.S. PATENT DOCUMENTS

| | | | |
|---|---|---|---|
| 8,370,574 B2 | 2/2013 | Ballard et al. | |
| 2006/0294305 A1* | 12/2006 | Ballard | G06F 11/073 711/115 |
| 2010/0106744 A1* | 4/2010 | Wang | G06F 17/30206 707/783 |

OTHER PUBLICATIONS

IBM, "IBM System Storage TS7600 with ProtecTIER: User's Guide," Copyright International Business Machines Corporation 2008, 2009 (204 pages).

* cited by examiner

PROTECTING DATA SEGMENTS IN A COMPUTING ENVIRONMENT

CROSS REFERENCE TO RELATED APPLICATIONS

This Application is a Continuation of U.S. patent application Ser. No. 13/801,449, filed on Mar. 13, 2013, which is a Continuation of U.S. patent application Ser. No. 13/152,099, now U.S. Pat. No. 9,292,535, filed on Jun. 2, 2011.

BACKGROUND OF THE INVENTION

Field of the Invention

The present invention relates in general to computers, and more particularly to protecting data segments, such as protecting virtual cartridges between remotely located virtual tape libraries, in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Virtual storage components are found in a variety of computing environments. A typical virtual storage component is the magnetic tape cartridge used via a magnetic tape drive. Multiple tape drives may be contained in a tape library, along with several slots to hold tape cartridges. Such data storage systems utilize storage components (usually direct access storage, such as disk arrays) to virtually present tape libraries or tape drives. Both types of technologies are commonly used for backup and recovery purposes. Virtual tape libraries, which integrate with existing backup software and existing backup and recovery processes, enable typically faster backup and recovery operations. It is often required that such data storage entities be replicated from their origin site to remote sites. Replicated data systems may externalize various logical data storage entities, such as files, data objects, backup images, data snapshots or virtual tape cartridges.

SUMMARY OF THE DESCRIBED EMBODIMENTS

Managing a multi site production environment is a formidable task within a data storage system. Within these multi site production environments, the data storage centers with virtual tape cartridges confront day-to-day backup and replication cycles. Such processes may suffer lack of synchronization over a virtual tape cartridge owner, loss of data, and potential data corruption. As a result, efficiency and productivity may be reduced.

Accordingly, and in view of the foregoing, various exemplary method, system, and computer program product embodiments for protecting data segments by a processor device in a computing environment, are provided. In one embodiment, by way of example only, a method comprises, if an error occurs during a replication operation from a source location to a destination location causing at least one of a plurality of data segments to be deleted in the source location, performing: executing a failback operation by a reverse replication process of the at least one of a plurality of data segments from the destination location to the source location, and regaining ownership of the at least one of a plurality of data segments by the source location; and pursuant to the failback operation, performing: enabling the reverse replication process if an owner of the at least one of a plurality of data segments is a designated one of the destination location, and adding an invalid owner notification in a history table, wherein the failback operation is identified for the designated one of the at least one destination location.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, managing a multi site production environment may be a formidable task within a data storage system. Within these multi site production environments, the data storage centers with virtual tape cartridges confront day-to-day backup and replication cycles. Such processes may suffer a lack of synchronization over a virtual tape cartridge owner, loss of data, and potential data corruption. For example, virtual cartridges may gain write permissions on two or more production sites, thus causing data loss and corruption. Moreover, these multi site production environments may have multiple backup applications, each with its unique cartridges database. Thus, for example, if a virtual cartridge has been replicated to a different site while retaining its barcode ID, the second site may be unaware that this virtual cartridge may be appended or truncated by another site. Such problems may arise when two or more cartridge instances are changed locally at each site and then a replication operation is performed for another site. For example, consider an environment with three sites: site A, site B, and site C. Site A replicates cartridge 1 to site B. However, for some reason, both sites A and B gain ownership over the cartridge and both sites locally change the data. These two instances of the cartridge now contain different data due to the change of data after replication. If both site A and site B attempt to replicate to site C there may be a loss of data. This loss of data may occur as a result of site A being the first site to replicate its instance of cartridge 1 to site C. Subsequently, site B replicates its own instance of cartridge 1 to site C. The replication from site B increases the risk of data loss by succeeding in replication without any errors and overriding the data replicated from site A, thus cartridge 1 in site C will contain the data from site B. At this point in time there is no existing replica of the cartridge at the originated site A, although there is an indication on site A that a replica exists at site C, as will be describe below in FIG. 4.

In contrast, and to address the inefficiencies and performance issues previously described, the illustrated embodiments provide mechanisms for protecting data segments (e.g., virtual tape cartridges) in a computing environment. The mechanisms, for example, configure a history table to accompany data segments for consultation during a replication operation. If the history table indicates an ownership conflict, the replication operation is inhibited.

Figure 1:
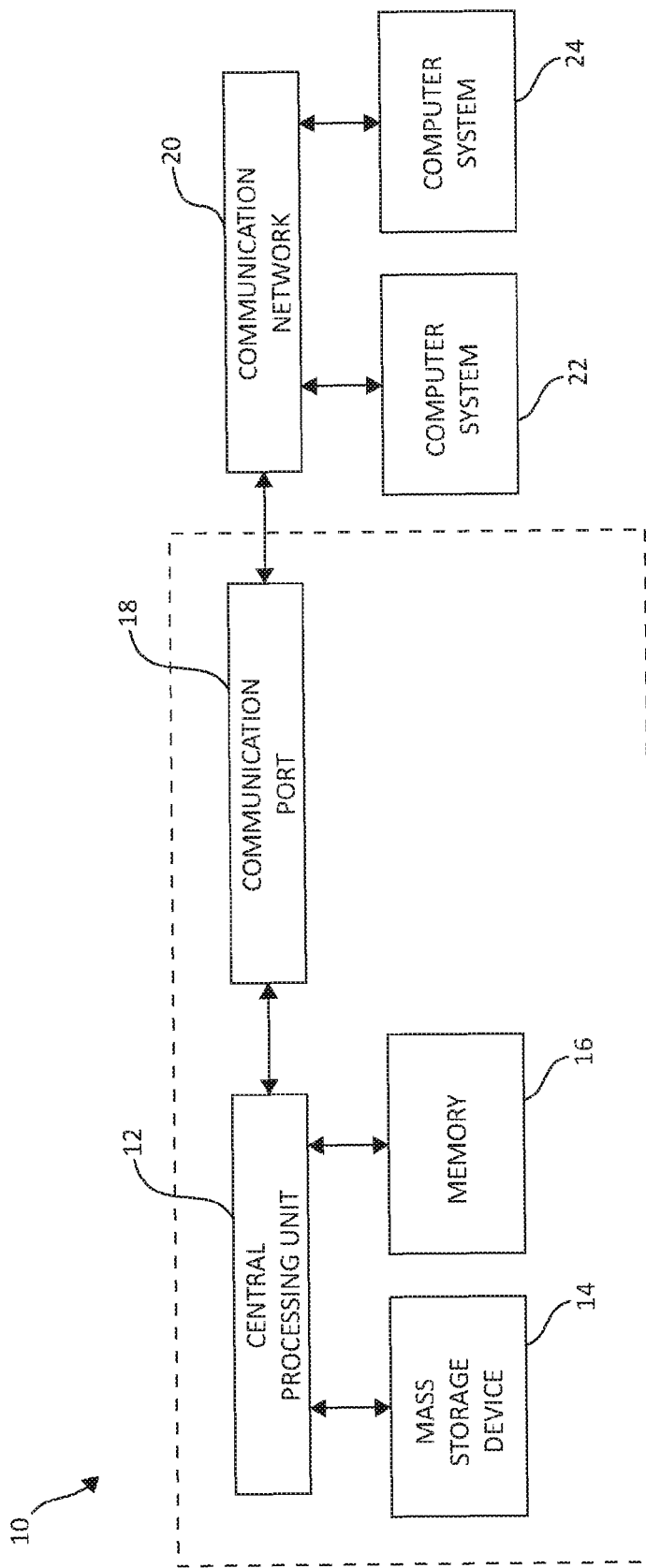
FIG. 1 illustrates a computer storage environment having an example storage device in which aspects of the present invention may be realized.

Turning now to FIG. 1, exemplary architecture 10 of data storage systems (e.g., virtual tape systems) in a computing environment is depicted. The computer system 10 includes central processing unit (CPU) 12, which is connected to mass storage device(s) 14 and memory device 16. Mass storage devices can include hard disk drive (HDD) devices, solid-state devices (SSD) etc., which can be configured in a redundant array of independent disks (RAID). The backup operations further described can be executed on device(s) 14, located in system 10 or elsewhere. Memory device 16 can include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24.

Figure 2:
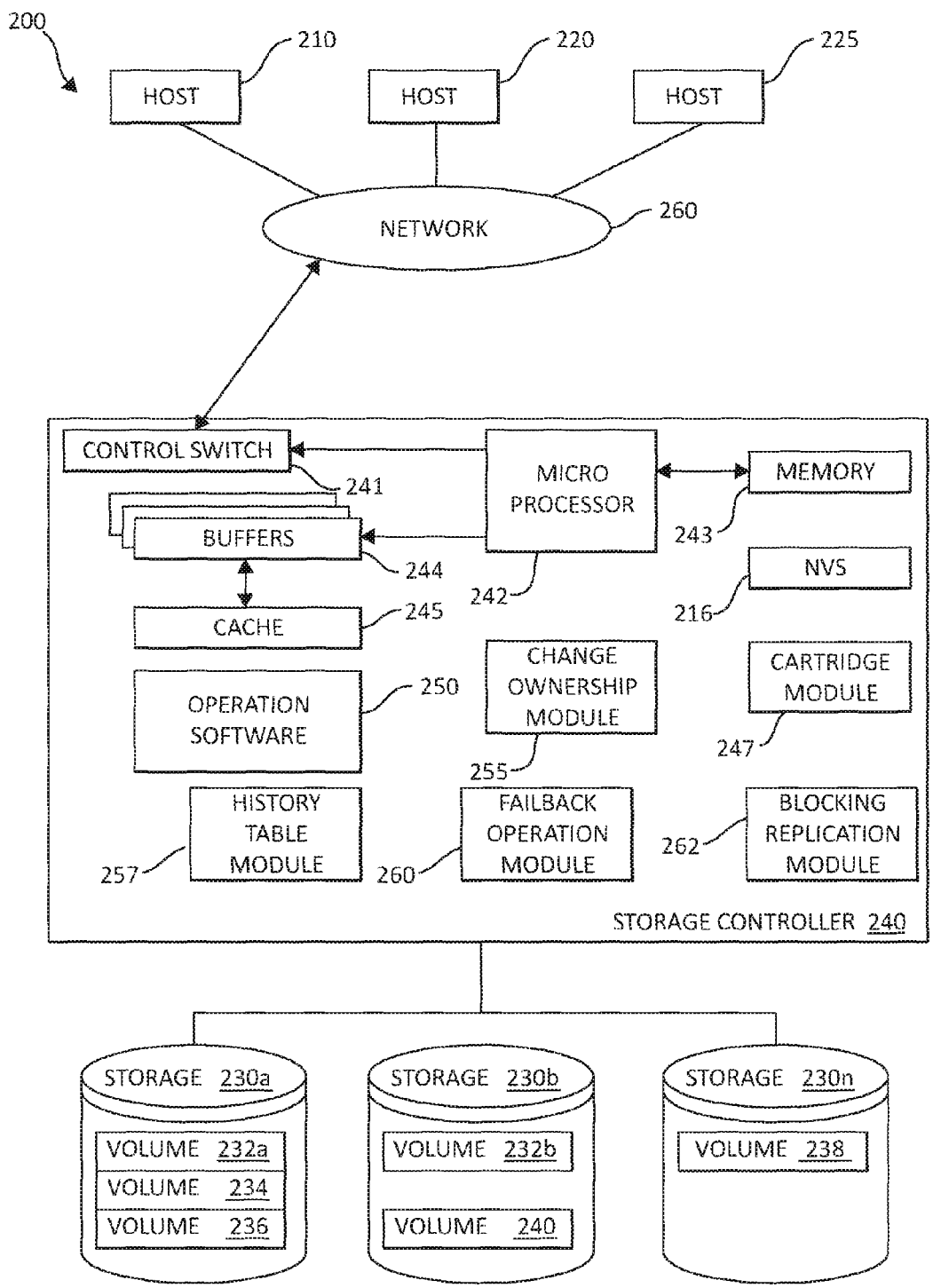
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Referring to FIG. 2, there are shown host computers 210, 220, 225, each acting as a central processing unit for performing data processing a part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 1 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps associated with managing storage 230 and executing the steps and methods of the present invention for protecting data (e.g., protecting data within virtual cartridges) in a computer storage environment. In one embodiment, system memory 243 includes, is associated, or is in communication with the operation software 250 for protecting data (e.g., protecting data within virtual cartridges) in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the Cache 245 for any purposes suited to accomplish the objectives of the present invention. In some embodiments, a backup power source (not shown in FIG. 2), such a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a change ownership module 255, cartridge module 247, history table module 257, failback operation module 260, and a blocking replication module 262 to assist with protecting data (e.g., protecting data within virtual cartridges) in a computer storage environment. The change ownership module 255, cartridge module 247, history table module 257, failback operation module 260, and blocking replication module 262 may work in conjunction with each and every component of the storage controller 240, the hosts 210, 220, 225, and storage devices 230. The change ownership module 255, cartridge module 247, history table module 257, failback operation module 260, and blocking replication module 262 may be structurally one complete module working together and in conjunction for protecting data (e.g., protecting data within virtual cartridges) in a computer storage environment or may be individual modules. The change ownership module 255, cartridge module 247, history table module 257, failback operation module 260, and blocking replication module 262 may also be located in the cache 245 or other components of the storage controller 240 to accomplish the purposes of the present invention.

The storage controller 240 may be constructed with a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, change ownership module 255, cartridge module 247, history table module 257, failback operation module 260, and the blocking replication module 262 on which information may be set. Multiple buffers 244 may be implemented with the present invention to assist with the protecting data (e.g., protecting data within virtual cartridges) in a computer storage environment.

In one embodiment, by way of example only, the host computers or one or more physical or virtual devices, 210, 220, 225 and the storage controller 240 are connected through a network adaptor (this could be a fiber channel) 260 as an interface i.e., via a switch called "Fabric." In one embodiment, by way of example only, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, change ownership module 255, and cartridge module 247 are in communication with each other and may be separate or one individual component(s). Also, several, if not all of the components, such as the operation software 245 may be included with the memory 243 for protecting data (e.g., protecting data within virtual cartridges) in a computer storage environment. Each of the components within the storage device may be linked together and may be in communication with each other for purposes suited to the present invention.

Figure 3:
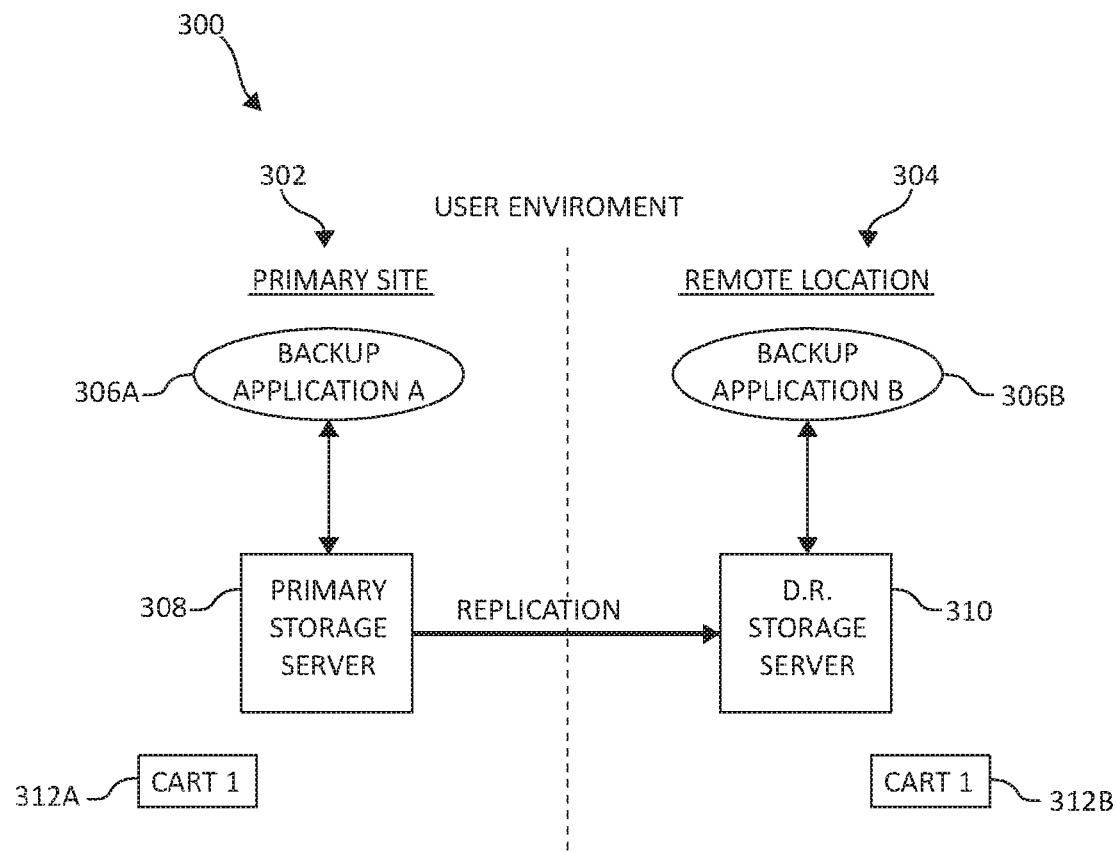
FIG. 3 illustrates an exemplary block diagram showing a computing environment when replicating virtual cartridges.

As previously mentioned, the illustrated embodiments provide mechanisms for protecting data, such as protecting virtual cartridges between remotely located virtual tape libraries, in a computing storage environment. FIG. 3 illustrates an exemplary block diagram 300 showing a computing environment that may be adapted for replicating virtual cartridges according to the mechanisms of the illustrated embodiments. For example, a primary storage server 308, within the primary site 302, may be a backup target 306A and also share its resources for replication activity to a secondary location 304 (remote location), for example a remote site 304 that is operating in a disaster recovery mode. The secondary location 304 (remote site) may include a secondary storage server 310 (or remote server or disaster recovery server). Cart 1 312A may be locally backed up and remotely replicated.

As illustrated in FIG. 3, the mechanisms of the illustrated embodiments seek, for example, to solve the problems that surface when there are different backup application databases (306A and 306B) making it possible to write on both cartridges 312A and 312B. An additional problem the mechanisms of the illustrated embodiments seek to address includes management of a production site move, meaning the data being backed up at the primary (or a source) site 302 is then changed to backing up the data to the secondary (or a destination) site 304 from a certain point in time to reduce load of the primary (source) site or for example disaster recovery test purposes. The operation to change production site requires synchronization in a replication grid context in order to define the owner of the cartridge in the grid, meaning basically, which site (system) 302 and/or 304 has write permissions enabled.

As will be described below, in one embodiment the mechanisms of the illustrated embodiments seek to protect data (e.g., protecting virtual cartridges between remotely located virtual tape libraries) from a primary location to a secondary location, for example, from a member of a replication grid, such as a source system, to a specified remote system (secondary system), such as a disaster recovery remote site. Thus, the mechanisms allow for a controlled production site move for a set of cartridges (e.g., virtual cartridges), which includes a means for a protecting the system's data segments (e.g., virtual cartridge ownership). In one embodiment, the mechanisms inhibit a replication to a third site when there are two owners of data (e.g., a virtual cartridge). If two sites gained ownership over data and/or particular data segment (e.g., a virtual cartridge) and then try to replicate it to a third replica site, the mechanisms may identify an ownership conflict (dual ownership) at the third replica site and block a second replication attempt performed by one of the data segment owners to the third site. The mechanisms may issue an error notifying a user that there are two owners for a particular data segment (e.g., a virtual cartridge) with a request to delete the second (e.g., a wrong) replica, or any other solution chosen by the user. Thus, efficiency and production is increased by the ability to protect data while performing a replication and change ownership operation.

Figure 4:
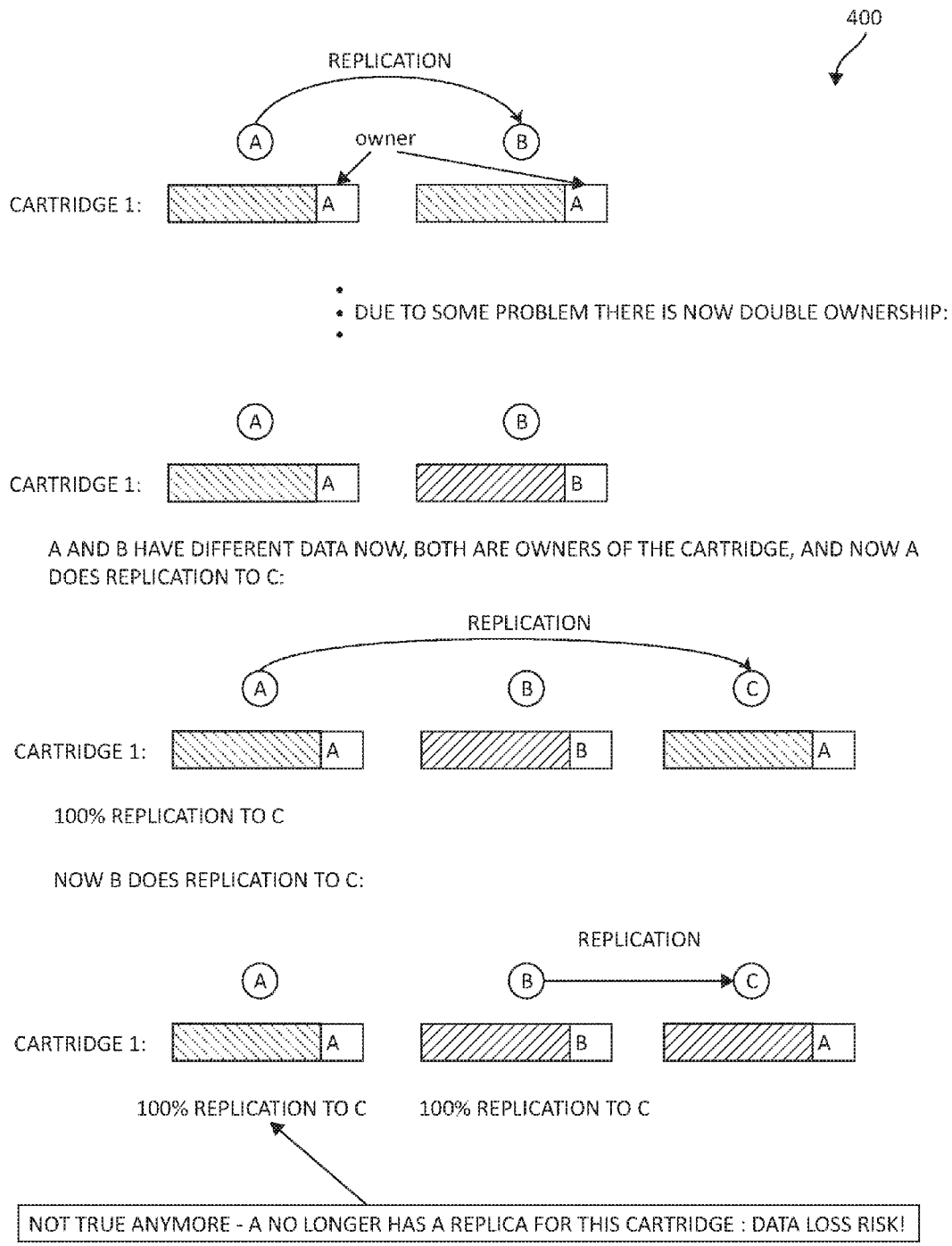
FIG. 4 illustrates an exemplary block diagram showing hazards of dual ownership.

FIG. 4 illustrates an exemplary block diagram 400 showing hazards of dual ownership. FIG. 4 illustrates the risk of having two owners for the same virtual cartridge. If site A and site B have ownership over cartridge 1 (cartridge 1 illustrates the data by a shaded portion with the ending prefix indicating the owner at the particular site, e.g., cartridge 1 at site A is owned by site A and cartridge 1 at site B is owned by B) and then both replicate to a third site C, then cartridge 1 at the site that replicated first (site A in FIG. 4) will loose its replica copy thereby risking a potential data loss in case of a disaster event, due to the site B later performing a replication processes at site C. As illustrated in FIG. 4, due to some situation there may be a double ownership problem with cartridge 1 being owned by site A and site B. (In a general sense, if a user removes a site from a grid or performs actions by force when declaring that a site is down and then brings the site up again, such actions may lead to unavoidable double ownership.) In the event that both site A and site B locally change the data, site A and site B have different data, but both sites retain ownership of cartridge 1. If site A performs a replication to site C, the data from site A will be completely replicated to site C (e.g., 100% replication) and at site C the cartridge's owner is site A, as indicated in the prefix by the "A." Subsequently, if site B performs a replication to site C, the data from site B will be completely replicated to site C (e.g., 100% replication) and at site C the cartridge's owner is site B, as indicated in the prefix by the "B." Thus, the complete replication from site A to site C is no longer true since the replica of data from site B to site C may have deleted and/or eliminated data from on site C that was originally replicated from site A. (100% replication from site A to site C is no longer true and there is a data loss risk).

In general, it may not be desirable to allow overriding virtual cartridges in a situation where there may be a single owner that replaced the current owner of the virtual cartridge. For example, cartridge 1 is created at site A and owned by site A. Site A replicates cartridge 1 to site B and site C. The user changes ownership of cartridge 1 from site A to site B. The user then replicates cartridge 1 from site B to site C. At this point, at site C, it may be desirable to allow the overriding of the data replicated from site A for this cartridge with the data replicated from site B, as site B is now the legal, single owner of the cartridge. Thus, the mechanism of the present invention distinguish between a situation of double ownership of a data segment where it should block the replication and a situation of a replaced owner, where any replication should be enabled. The mechanisms of the present invention seek to avoid risking the loss of data while enabling replication of virtual cartridges with replaced ownership.

Moreover, the mechanisms of the present invention seek to avoid the double ownership problem along with eliminating any requirements that the sites must be connected through a centralized grid management component and that all the operations must be synchronized. In one embodiment, by way of example only, the mechanisms incorporate a feedback operation in case of failback. The failback operation is the procedure for performing a reverse replication from the replica site back to the production source site in the event that the data (e.g., virtual cartridge) at the source site is lost. The failback operation allows the source site to regain ownership of the cartridge. Thus, the mechanisms, as will be described below, provide a solution to eliminate the risk of data loss risk if there are multiple owners of data (e.g., virtual cartridges) by eliminating the overriding of each sites data during a replication process to a third site, while simultaneously enabling replication of data (e.g., virtual cartridges) for replaced ownership of the data.

Figure 5:
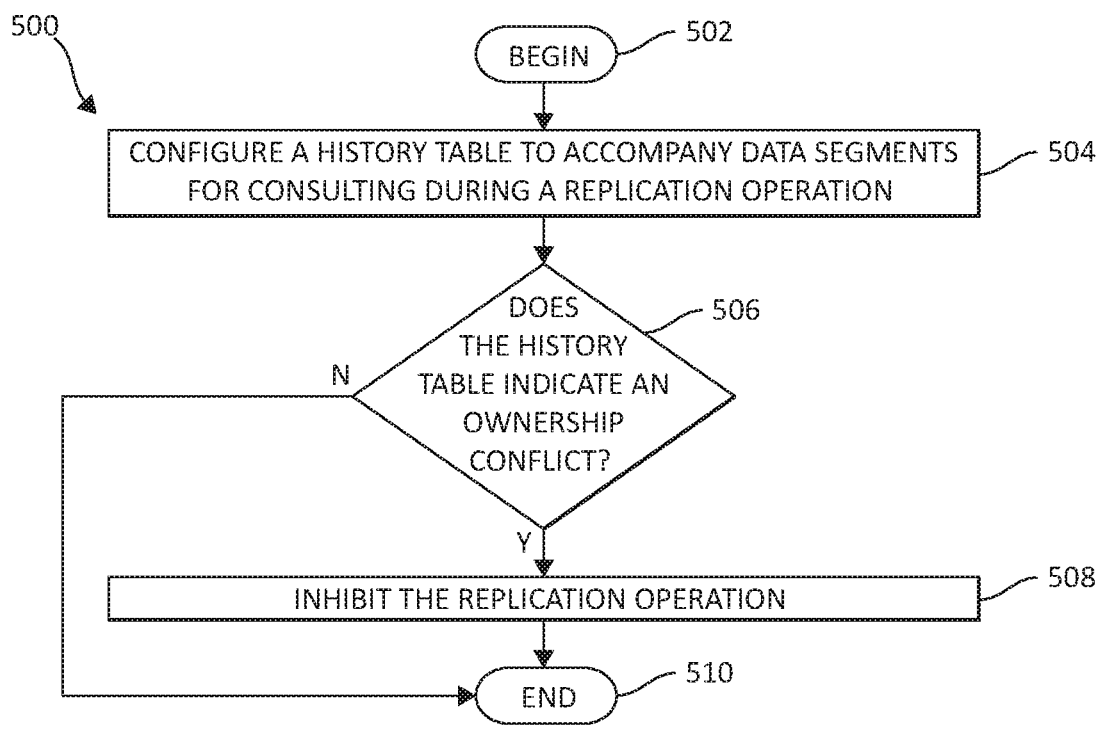
FIG. 5 is a flowchart illustrating an exemplary method for protecting data.

Turning to FIG. 5, FIG. 5 is a flowchart illustrating an exemplary method 500 for protecting data. The method 500 begins (step 502) by configuring a history table to accompany data segments for consulting during a replication operation (step 504). The method 500 determines if the history table indicates an ownership conflict (e.g., dual owners) (step 506). If no, the method ends (step 510). If there is an ownership conflict, the replication operation is inhibited (blocked) (step 508). The method ends (step 510).

In an alternative embodiment, the mechanisms provide for the protection of data segments by inhibiting and/or blocking the replication to a third site in the case of multiple owners of the data segments (e.g., virtual cartridges). If two sites gained ownership on the particular data segment, and then one of the owners replicate the data segments to a third replica site, the dual ownership situation is identified at the third replica site and the mechanism may block the subsequent replication performed by the second owner of the data segment. The user will receive an error indicating the dual ownership of the data segments (e.g., a virtual cartridge)

with a request to handle the dual ownership by deleting the wrong replica or by solution chosen by the user.

Figure 6A:
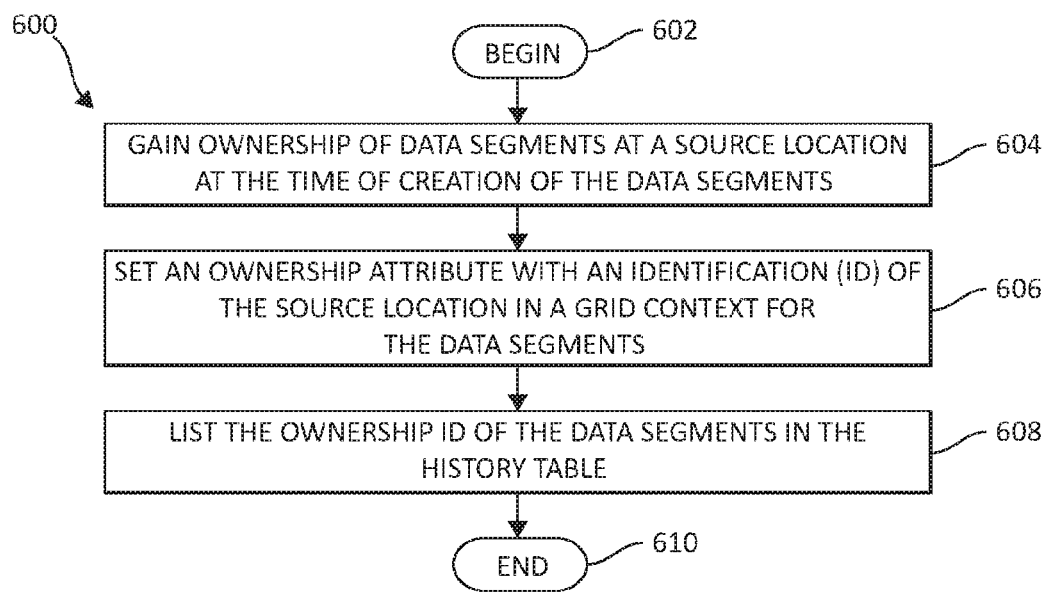
FIG. 6A is a flowchart illustrating an exemplary method for establishing initial ownership with a history table.

Turning to FIG. 6A, FIG. 6A is a flowchart illustrating an exemplary method 600 for establishing initial ownership with a history table. The method 600 begins (step 602) by gaining ownership of data segments at a source location at the time of creation of the data segments (step 604). An ownership attribute is set with an identification (ID) of the source location in a grid context for the data segments (step 606). The ownership ID of the data segments is listed in the history table (step 608). The method ends (610).

In an alternative embodiment, once a cartridge is created, it may gain ownership of its creator system. The ownership attribute is set with the creator system's ID in a grid context. The cartridge located in its owner's system receives read/write permissions for backup applications (meaning the cartridge may be backed up on by the backup application). The history table may contain a single entry, with the current identification of the owner of the data segment. This is described below in FIG. 6B.

Figure 6B:
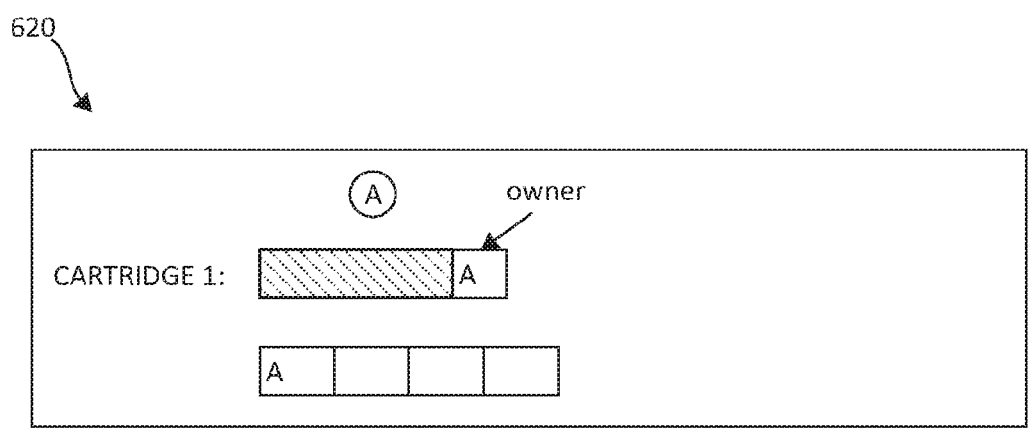
FIG. 6B illustrates an exemplary block diagram showing initial ownership with a history table.

FIG. 6B illustrates an exemplary block diagram 620 showing initial ownership with a history table. FIG. 6B illustrates cartridge 1 and site A. Cartridge 1 illustrates the data by a shaded portion with the ending prefix indicating the owner of the cartridge, e.g., cartridge 1 at site A is owned by site A. The history table includes in the history table grid the owner of cartridge 1 by indicating an "A" in the history table.

Figure 7A:
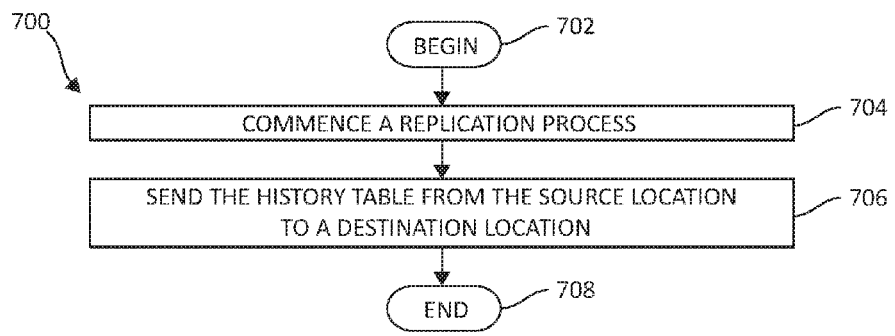
FIG. 7A is a flowchart illustrating an exemplary method for performing the replication operation and sending the history table with the replicated data.

As mentioned above (e.g., step 504, FIG. 5), a history table is configured to accompany data segments for consulting during a replication operation. By use of the history table indicating ownership of data (e.g., a virtual data cartridge), a replication process may be blocked and/or enabled. With the foregoing in mind, FIG. 7A is a flowchart illustrating an exemplary method 700 for performing the replication operation and sending the history table with the replicated data. The method 700 begins (step 702) by commencing a replication process (step 704). A history table is sent with the data from the source location to a destination location (step 706). The method 700 ends (step 708).

Figure 7B:
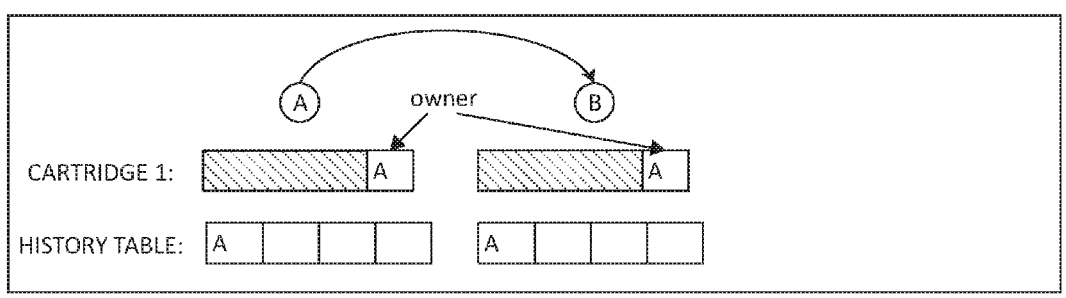
FIG. 7B illustrates an exemplary block diagram showing replication from site A to site B.

FIG. 7B illustrates an exemplary block diagram 720 showing replication from site A to site B. FIG. 7B shows that cartridge 1 is created at site A. Cartridge 1 illustrates the data by a shaded portion with the ending prefix indicating the owner of the cartridge, e.g., cartridge 1 is created at site A is owned by site A.) The history table includes in the history table grid the owner of cartridge 1 by indicating an "A" in the history table at the time of creation. A replication operation is performed replicating cartridge 1 from site A to site B. The replication of cartridge 1 still shows the data by a shaded portion with the ending prefix indicating the owner of the cartridge, e.g., cartridge 1 after replication is still owned by site A. In this case, the replication is not blocked with the history table and the prefix in cartridge 1 showing site A to be the owner in both site A and site B.

Figure 8A:
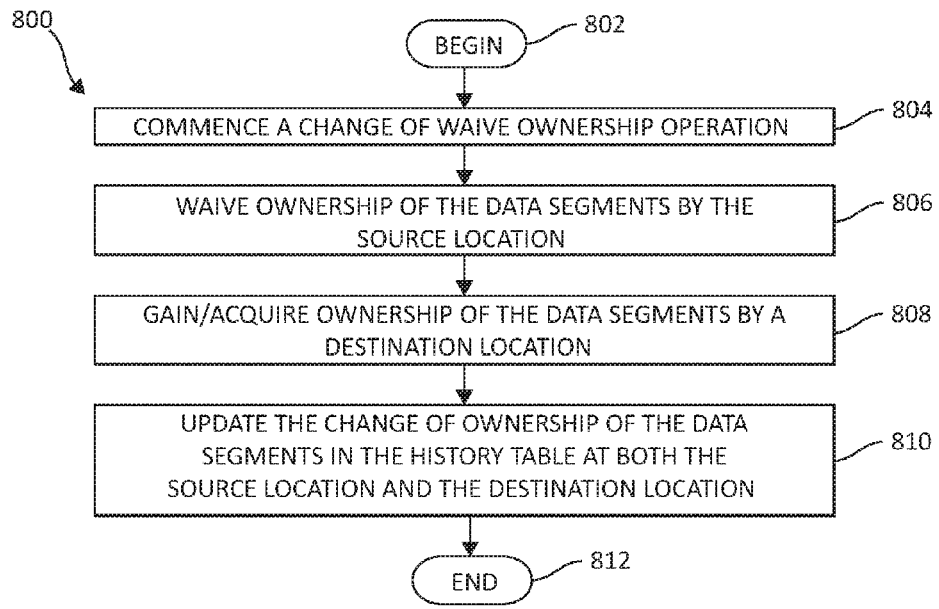
FIG. 8A is a flowchart illustrating an exemplary method for performing a change of ownership operation with the history table.

In FIG. 8A, a change of ownership operation with a history table is performed. FIG. 8A is a flowchart illustrating an exemplary method 800 for performing a change of ownership operation with the history table. The method 800 begins (step 802) by commencing a change of ownership process (step 804). The ownership of the data segments is waived by the source location (step 806). The ownership of the data segments are gained/acquired by a destination location (step 808). The change of ownership of the data segments is updated in the history table at both the source location and the destination location (step 810). The method ends (step 812). During the change of ownership, the history table is updated at both the source site that is waiving the ownership of the data (e.g., virtual cartridge) and also in the history table at the destination location/site that is gaining ownership of the data (e.g., virtual cartridge). The updated history tables add the new owner.

Figure 8B:
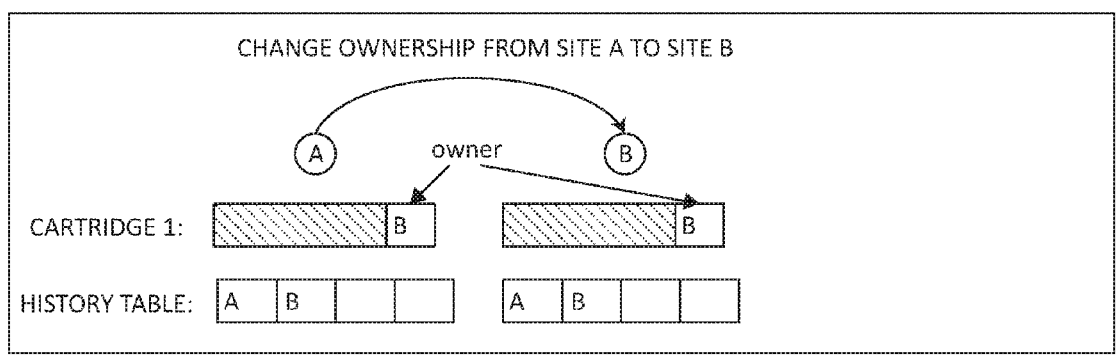
FIG. 8B illustrates an exemplary block diagram showing a coordinated change of ownership with a history table.

To further illustrate the change of ownership operation involving a history table for protecting of data segments, FIG. 8B illustrates an exemplary block diagram 820 showing a coordinated change of ownership with the history table. In FIG. 8B, site A waives ownership and site B gains ownership of cartridge 1. Cartridge 1 illustrates the data by a shaded portion with the ending prefix indicating the current owner of the cartridge, e.g., cartridge 1 is updated to show that site B is the owner after the change of ownership operation from site A to site B.) Included in the history table is a history table grid indicating the past and current owners of cartridge 1. In FIG. 8B, the owner of cartridge 1 is indicated by the letter "A" in the history table for the first owner of cartridge 1 and a "B" in the history table showing the next subsequent owner, which is now site B, of cartridge 1. The history table at both site A and site B is indicated.

Figure 9:
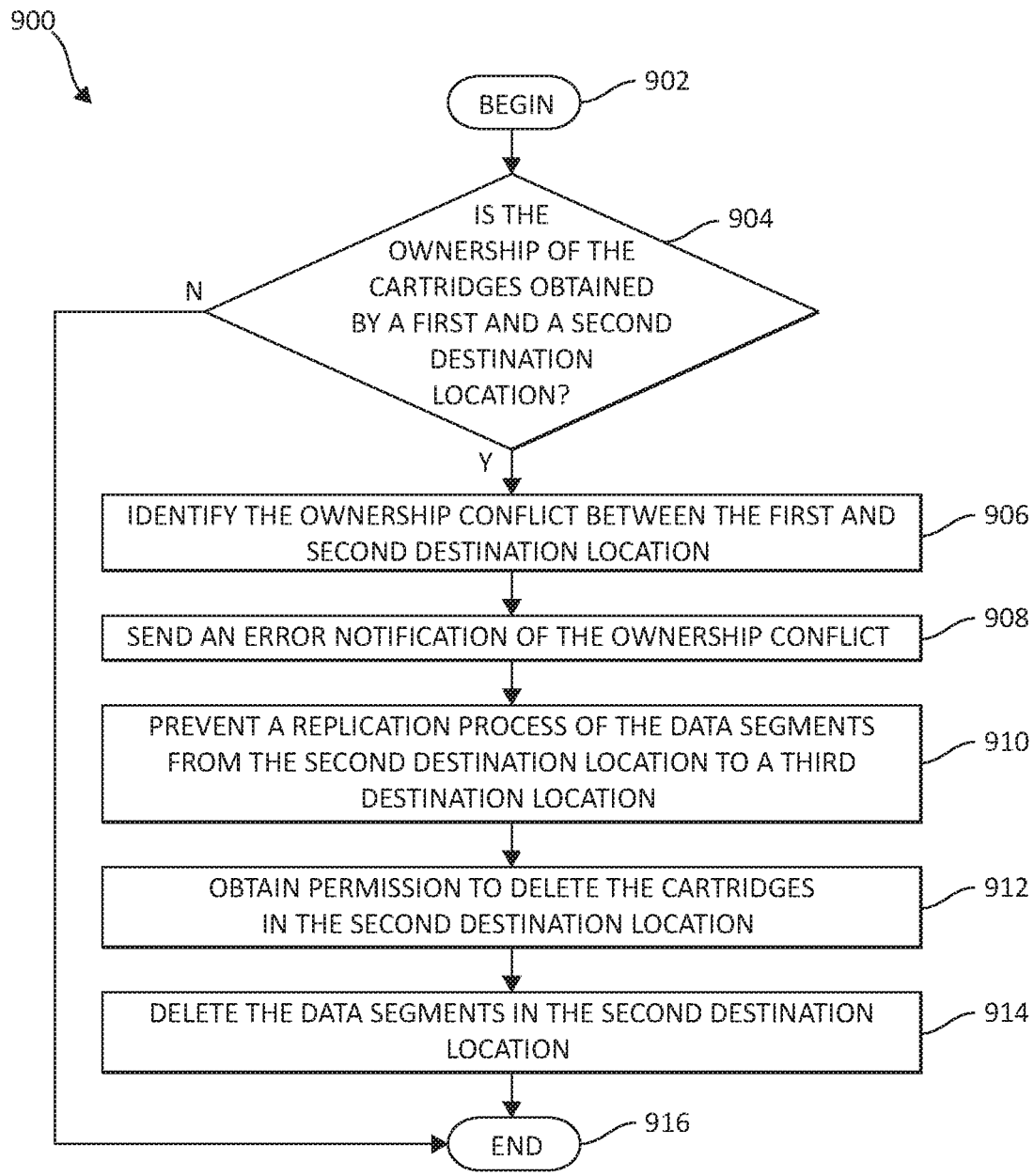
FIG. 9 is a flowchart illustrating an exemplary method for inhibiting the replication of data.

As mentioned previously, an ownership conflict may arise in the event of dual ownership. Turning to FIG. 9, FIG. 9 is a flowchart illustrating an exemplary method 900 for inhibiting the replication of data. The method 900 begins (902) by determining if the ownership of the cartridges is obtained by a first and a second destination location (step 904). If no, the method will end (step 914). If yes, the method 900 will identify the ownership conflict between the first and second destination location (step 906). An error notification is sent to notifying the system of the ownership conflict (step 908). The error may be sent to a user and/or any of the source/destination sites. A replication process of the data segments is prevented from being executed from the second destination location to a third destination location (step 910). The method obtains permission to delete the cartridges in the second destination location (step 912). The data segments are deleted in the second destination location (step 914). The method ends (step 916).

Figure 10A:
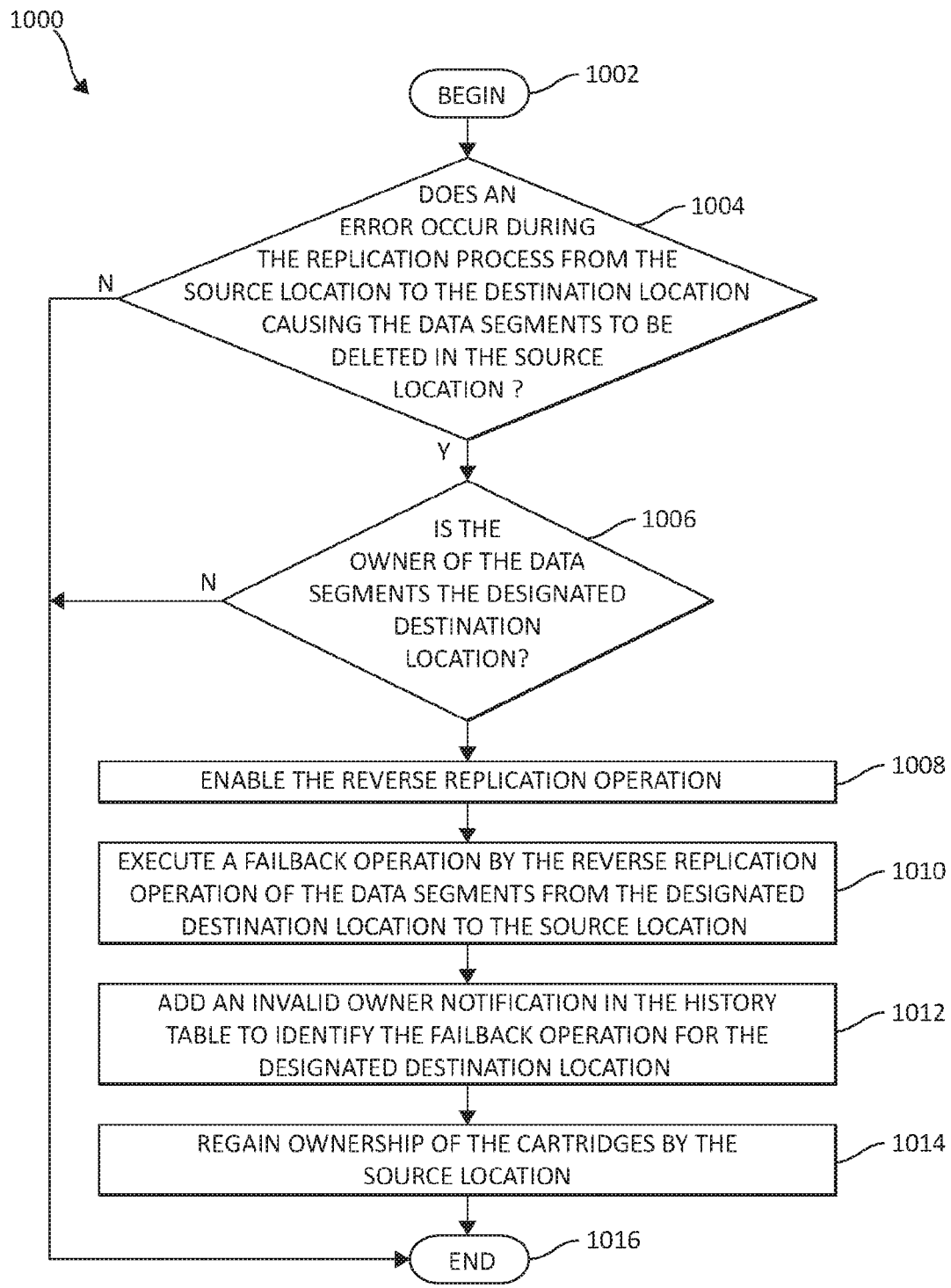
FIG. 10A is a flowchart illustrating an exemplary method for performing a failback operation.

During a replication process, it is possible that after replicating data (e.g., virtual cartridges) from the production source site to the replica destination site, errors may occur in the production site (either due to a technical problem or to a human mistake) where the cartridge in the source site is deleted. Turning to FIG. 10A, FIG. 10A is a flowchart illustrating an exemplary method 1000 for performing a failback operation. The method 1000 begins (step 1002) with an determining if an error occurred during the replication process from the source location to the destination location causing the data segments to be deleted in the source location (step 1004). If no, the method ends (step 1016). If yes, the method will determine if the owner of the data segments is the designated destination location (step 1006). If no, the method ends (step 1016). If yes, the method will enable a reverse replication operation (step 1008). A failback operation is executed by the reverse replication operation of the data segments from the destination location to the source location (step 1010). An invalid owner notification is added in the history table to identify the failback operation for the designated destination location (step 1012). During the failback operation a "not a valid owner" may be added to the history tables, following the production/source site identification (ID), to indicate that there was a failback process on this cartridge. This adding to the history table may occur at both the destination and the source location.

The ownership of the cartridges is regained/reacquired by the source location (step 1014). The method ends (step 1016).

Figure 10B:
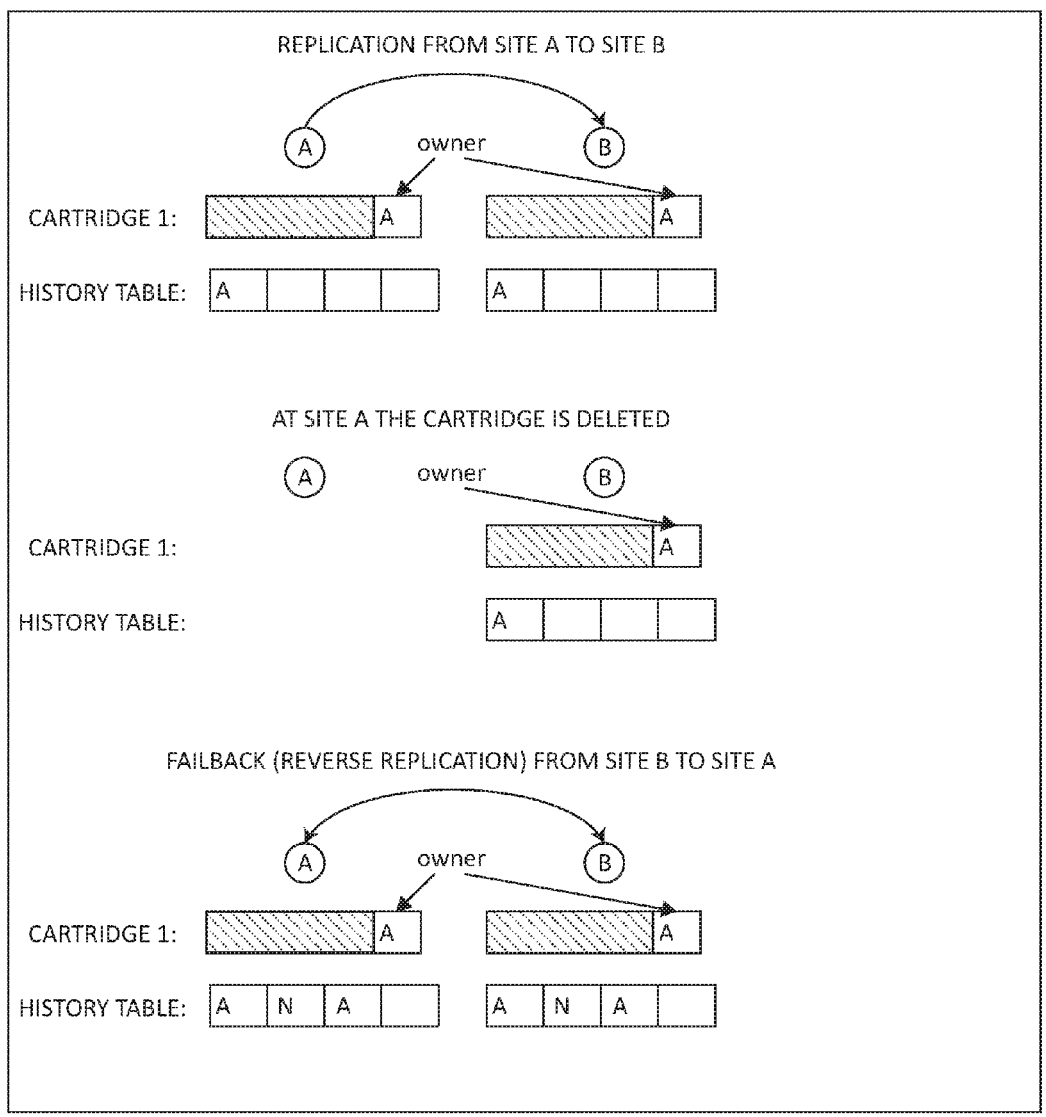
FIG. 10B illustrates an exemplary block diagram showing a failback operation.

FIG. 10B illustrates an exemplary block diagram 1050 showing a failback operation. In this case the user may want to perform a failback operation by reversing the replication of the cartridge (cartridge 1) from the destination replica site (site B) to the source production site (site A). In the beginning there is replication from the production site A to the replica site B. FIG. 10B illustrates that after replicating data (e.g., virtual cartridges) from the production source site (site A) to the replica destination site (site B), errors occurred in site A (either due to a technical problem or to a human mistake) where the cartridge in the site A was deleted. A failback operation (reverse replication) is performed from site B to site A, where an indication is added to the history table with the "N" symbol representing "not a valid owner" to show that there was a failback operation performed. The reverse replication allows for the source site (site A) to regain/reacquire ownership of the cartridge (cartridge 1) in the source production site (site A). However, the reverse replication is enabled if the owner of cartridge 1 is the designated production site, e.g. it may only be possible to perform the failback operation from site B to site A only if the owner of the data segment marked at site B (the destination site) is site A (the source site).

Figure 11:
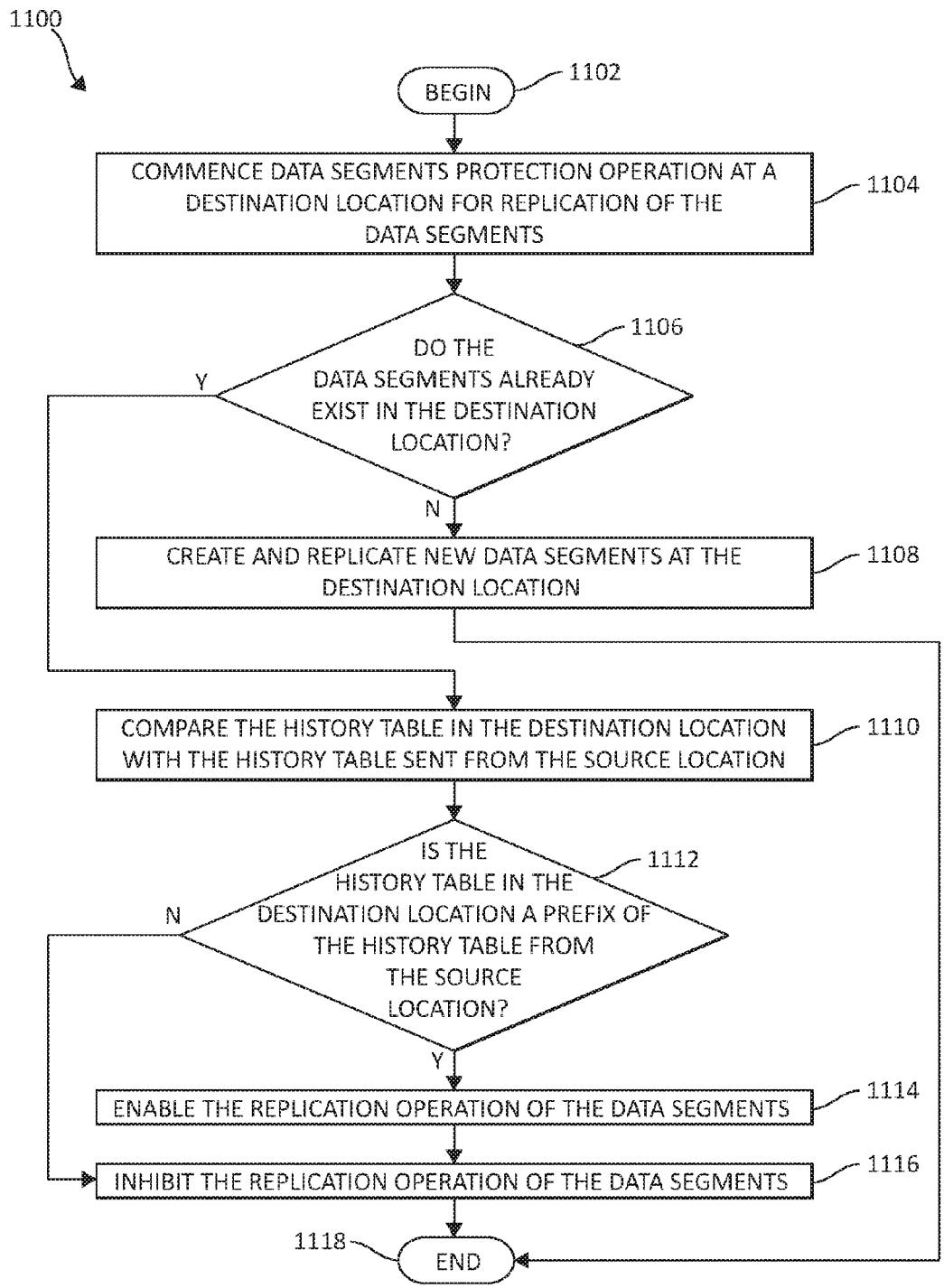
FIG. 11 is a flowchart illustrating an exemplary method for protecting data segments.

As mentioned previously, in the event of dual ownership over particular data segments, the mechanisms of the present invention provide data protection during replication and change of ownership. Turning to FIG. 11, FIG. 11 is a flowchart illustrating an exemplary method 1100 for data protection. The method 1100 begins (1102) by commencing the data protection operations at a destination location for replication of the data segments (step 1104). The method determines if the data segments already exist in the destination location (step 1106). If no, the method 1100 will create and replicate new data segments at the destination location (step 1108). If data segments previously/currently exist in the destination location, the method will compare the history table in the destination location with the history table sent from the source location (step 1110). The method 1100 will determine if the history table in the destination location is a prefix of the history table from the one source location (step 1112). If yes, the method will enable the replication operation of the data segments (step 1114). If the history table in the destination location is not a prefix of the history table from the source location, the method will inhibit the replication operation of the data segments (step 1116). The method ends (step 1118).

In an alternative embodiment, the mechanisms of the present invention receive an incoming replication for a specific cartridge at a replication site. The mechanisms check if the cartridge exists already at the replication site. If the cartridge does not presently exist in the replication site, then the data is created and replicated as a new cartridge at the replication site. If the cartridge does presently exist in the replication site, then the local history table at the replica site is compared to the history table sent with the data from the source site. If the local history table at the destination/replication site is a prefix of the history table from the source then the replication operation is enabled. This prefix indicates that the cartridge at the replica site had the same history of changes as the source, until some point, and then there were more changes at source that need to be updated at the replica. This could be thought of as both cartridges had the same history, and at the source this history continued farther, and therefore it is safe to update the destination with these changes.

Alternatively, if the local history table at the destination/replica site is not a prefix of the history table from the source site, then the replication is blocked. If the history table at the replica site is not a prefix of the history table at the source, it means one of two things. First, if the local history table at the destination/replica site is not a prefix of the history table from the source, it may indicate that at some point in time the history came to a split point, where there were two owners of the same cartridge. The history of the cartridge in the destination may be different from the history table at the source, and could be more up to date. Second, it may indicated that the cartridge at the destination site is more updated with the ownership changes of the specific cartridge, and therefore, the mechanisms may not accept a replication from a site that doesn't have all the recent changes. Thus, in both cases, the replication should be blocked.

Figure 12A:
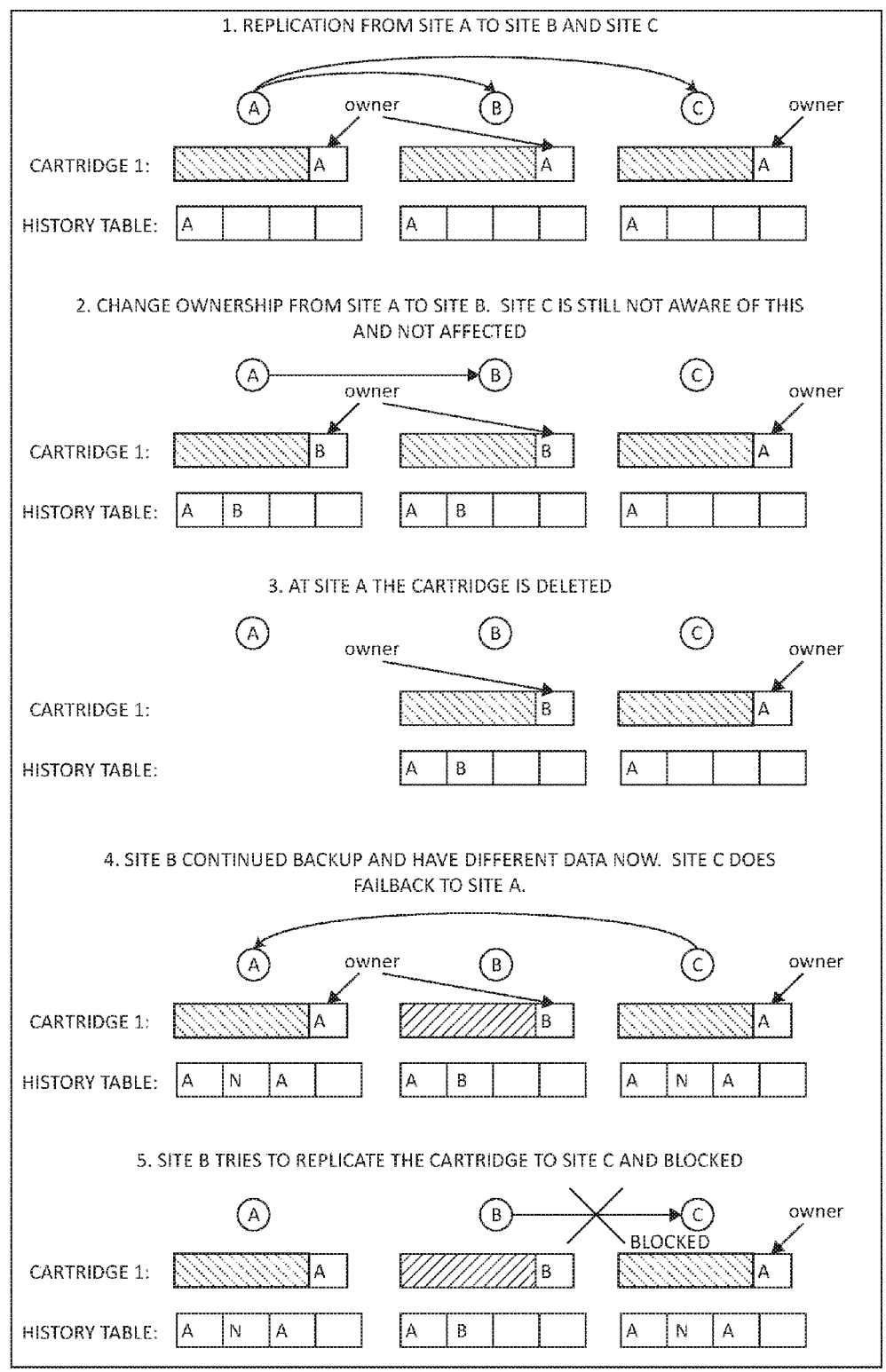
FIG. 12A illustrates an exemplary block diagram creating a cartridge at site A and replicating to site B and site C.
Figure 12B:
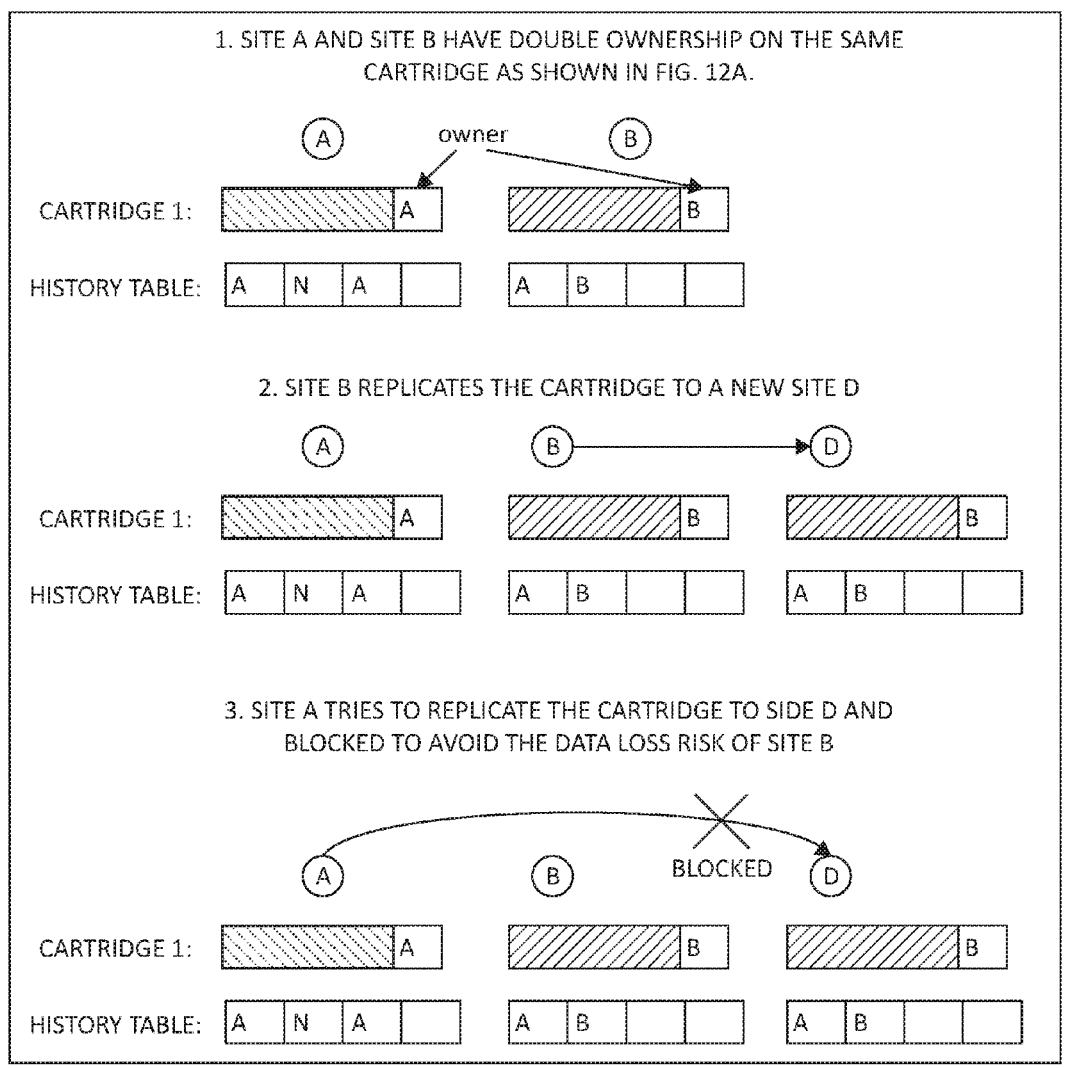
FIG. 12B illustrates an exemplary block diagram showing dual ownership of cartridge 1 and blocking replication from site B to site D.
Figure 12C:
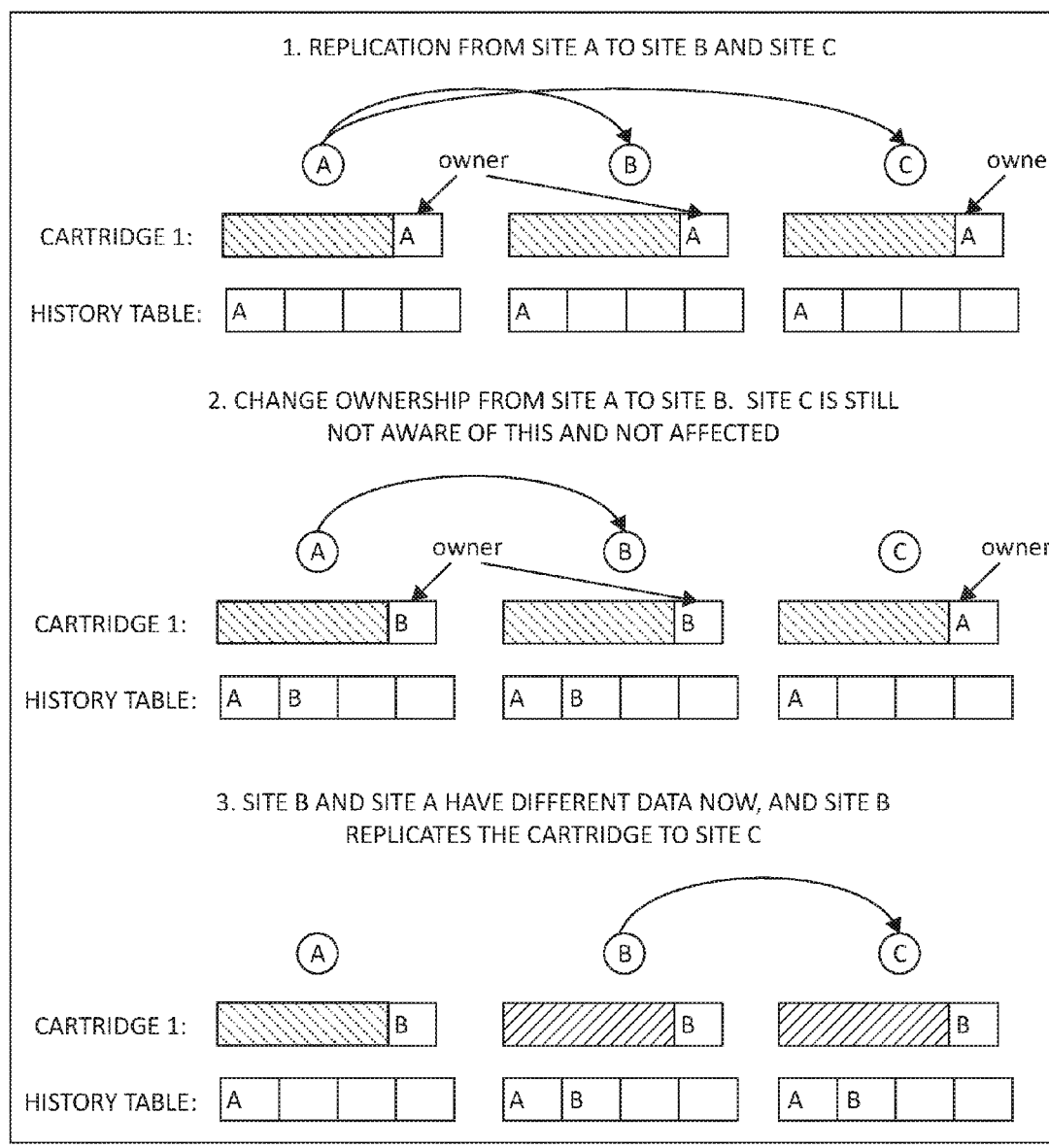
FIG. 12C illustrates an exemplary block diagram showing the enabling of a replication operation.

FIGS. 12A, 12B, and 12C show several different scenarios and behavioral patterns for the protection of data in dual ownership environments. In all three figures (FIGS. 12A, 12B, and 12C), site A, site B, site C, and/or site D are illustrated, by way of example only. Each figure illustrates cartridge 1 containing data, which is illustrated by a shaded portion with the ending prefix indicating the owner at the particular site (e.g., cartridge 1 at site A may be owned by site A, cartridge 1 at site B may be owned by site A, cartridge 1 at site C may be owned by site B, and/or cartridge 1 at site D may be owned by site C). A history table is illustrated with a history table grid indicating the current owner and the history of owners for cartridge 1 by indicating an "A" in the history table for ownership by site A, a "B" in the history table for ownership by site B, "C" in the history table for ownership by site C, and "D" cartridge 1 at site A may be owned by site D. Moreover, in the event a failback operation is performed the symbol "N" is illustrated for representing "not a valid owner" to show that there was a failback operation performed at a particular site.

Turning first to FIG. 12A, FIG. 12A illustrates an exemplary block diagram 1200 creating a cartridge at site A and replicating (the cartridge created at site A) to site B and site C. FIG. 12A, first shows a replication operation performed for cartridge 1 from site A to site B and to site C. Site A maintains ownership of cartridge 1 at site A, site B, and site C. Next, a changing ownership is performed from site A to site B. The history table is updated to show the change of ownership by adding a "B" into the history table for site A and site B but left empty at site C. The cartridge is then deleted at site A. A failback operation from site C to site A is now performed on cartridge 1 from site C to site A. An "N" is added to the history table at site A and site C to indicate the failback operation occurred at site A and C. During this time the cartridge is modified at site B. A replication from site B to site C of this cartridge is now blocked. Only site A may now replicate to site C.

Turning first to FIG. 12B, FIG. 12B illustrates an exemplary block diagram 1200 showing dual ownership of cartridge 1 and blocking replication from site B to site D. FIG. 12B, is a continuation of FIG. 12A, where section 1. Indicates "site A and site B have a double ownership on the same cartridge as illustrated in FIG. 12A. The change of ownership operation that was performed in FIG. 12A is illustrated. The history table shows the change of ownership history of site A by showing an A, N (the failback operation as performed in FIG. 12A, and A. Thus, site A currently owns cartridge 1 at site A. The history table of site B shows by A and B. Thus, the "B" represents that site B currently owns cartridge 1 at site B. Thus, in this scenario, a dual ownership is illustrated for cartridge 1 at both site A and site B. In section 2, of FIG. 12B, the figure indicates "site B replicates the cartridge to a new site D." Site B attempts to perform the replication operation to a new site D and succeeds. In section 3 of FIG. 12B, the figure indicates that "site A tries to replicate the cartridge to site D and is blocked to avoid the data loss risk of site B." When trying to replicate the same cartridge from site A the replication is blocked. The replication is blocked to avoid the case, where at site B the user sees that the cartridge is fully replicated to site D, and then the replication from site A overrides this data. This example may be reversed with site A first performing the replication from site A to site D with success. Then, if site B attempts to replicate to site D, for similar reasons stated above, the replication from site B may be blocked.

Turning first to FIG. 12C, FIG. 12C illustrates an exemplary block diagram 1200 showing the enabling of a replication operation. In FIG. 12C, in section 1, the figure illustrates the creating cartridge at site A and replicating to site B and site C. This process is similar to FIG. 12A, by showing a replication operation performed for cartridge 1 from site A to site B and to site C. Site A maintains ownership of cartridge 1 at site A, site B, and site C. In section 2 of FIG. 12C, the figure illustrates site A changing ownership of the cartridge to site B. The change of ownership from site A to site B occurs, but site C is unaware of the change and is not affected. In section 3 of FIG. 12C, the figure demonstrates that site B replicates to site C. Site B and site A now have different data as a result of a modification at the local site(s) and site B attempts to replicate to site C. Site C enables the replication because the data in site B is more up-to-date.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for protecting a plurality of data segments by a processor device in a computing environment, comprising:
    if an error occurs during a replication operation from a source location to a destination location causing at least one of a plurality of data segments to be deleted in the source location, performing:
        executing a failback operation by a reverse replication process of the at least one of a plurality of data segments from the destination location to the source location, and
        regaining ownership of the at least one of a plurality of data segments by the source location; and
    pursuant to the failback operation, performing:
        enabling the reverse replication process if an owner of the at least one of a plurality of data segments is a designated one of the destination location, and
        adding an invalid owner notification in a history table, wherein the failback operation is identified for the designated one of the at least one destination location.

2. The method of claim 1, further including configuring the history table to accompany each of the plurality of data segments for consultation during the replication operation, wherein if the history table indicates an ownership conflict, the replication operation is inhibited; and
    establishing an initial ownership of the plurality of data segments, including performing:
        gaining ownership of a source location at the time of creation of the plurality of data segments,
        setting an ownership attribute with an ownership identification (ID) of the at least one source location in a grid context for the plurality of data segments, and
        listing the ownership ID of the plurality of data segments in the history table.

3. The method of claim 2, further including, in conjunction with the replication operation, sending the history table from a source location to a destination location.

4. The method of claim 2, further including, pursuant to a change of ownership of at least one of the plurality of data segments, performing:
    waiving ownership of the at least one of the plurality of data segments for a source location,
    gaining the ownership of the at least one of the plurality of data segments by a destination location, and
    updating the ownership of the at least one of the plurality of data segments in the history table at both the source location and the destination location.

5. The method of claim 2, further including, if ownership of at least one of the plurality of data segments is obtained by a first and second destination location:
    identifying the ownership conflict between the first and second destination location,
    sending an error notification of the ownership conflict,
    preventing the replication operation of the at least one of the plurality of data segments from the second destination location to a third destination location, and
    deleting the at least one of the plurality of data segments in the second destination location.

6. The method of claim 2, further including, in conjunction with the replication operation, performing:
    if the at least one of a plurality of data segments does not exist in a destination location:
        replicating the at least one of a plurality of data segments to the destination location, and
    if the at least one of the plurality of cartridges does exist in the destination location:
        comparing the history table in the destination location with the history table sent from a source location.

7. The method of claim 6, further including, pursuant to the comparing the history table in the destination location with history table sent from the source location, performing:
    if the history table in the destination location is a prefix of the history table from the source location:
        enabling the replication process of the at least one of a plurality of data segments, and
    if the history table in the destination location is not the prefix of the history table from the source location:
        inhibiting the replication process of the at least one of a plurality of data segments.

8. A system for protecting a plurality of data segments in a computing environment, comprising:
    at least one processor device, operable in the computing environment, wherein the at least one processor device is adapted for:
        if an error occurs during a replication operation from a source location to a destination location causing at least one of a plurality of data segments to be deleted in the source location, performing:
            executing a failback operation by a reverse replication process of the at least one of a plurality of data segments from the destination location to the source location, and
            regaining ownership of the at least one of a plurality of data segments by the source location, and
        pursuant to the failback operation, performing:
            enabling the reverse replication process if an owner of the at least one of a plurality of data segments is a designated one of the destination location, and
            adding an invalid owner notification in a history table, wherein the failback operation is identified for the designated one of the at least one destination location.

9. The system of claim 8, wherein the at least one processor device is further adapted for performing:
    configuring the history table to accompany each of the plurality of data segments for consultation during a replication operation, wherein if the history table indicates an ownership conflict, the replication operation is inhibited, and
    establishing an initial ownership of the at least one of the plurality of cartridges, including performing at least one of:
        gaining ownership of a source location at the time of creation of the plurality of data segments,
        setting an ownership attribute with an ownership identification (ID) of the at least one source location in a grid context for the plurality of data segments, and listing the ownership ID of the plurality of data segments in the history table.

10. The system of claim 9, wherein the at least one processor device is further adapted for, in conjunction with the changing ownership, performing:
selecting the at least one primary location in a grid context from a replication grid manager, and
directly logging into the at least one primary location.

11. The system of claim 9, wherein the at least one processor device is further adapted for, in conjunction with the replication operation, sending the history table from a source location to a destination location.

12. The system of claim 9, wherein the at least one processor device is further adapted for, pursuant to a change of ownership of at least one of the plurality of data segments, performing:
waiving ownership of the at least one of the plurality of data segments for a source location,
gaining the ownership of the at least one of the plurality of data segments by a destination location, and
updating the ownership of the at least one of the plurality of data segments in the history table at both the source location and the destination location.

13. The system of claim 9, wherein the at least one processor device is further adapted for, if ownership of at least one of the plurality of data segments is obtained by a first and second destination location:
identifying the ownership conflict between the first and second destination location,
sending an error notification of the ownership conflict,
preventing the replication operation of the at least one of the plurality of data segments from the second destination location to a third destination location, and
deleting the at least one of the plurality of data segments in the second destination location.

14. The system of claim 9, wherein the at least one processor device is further adapted for, in conjunction with the replication operation, performing:
if the at least one of a plurality of data segments does not exist in a destination location:
replicating the at least one of a plurality of data segments to the destination location, and
if the at least one of the plurality of cartridges does exist in the destination location:
comparing the history table in the destination location with the history table sent from a source location.

15. The system of claim 14, wherein the at least one processor device is further adapted for, pursuant to the comparing the history table in the destination location with history table sent from the source location, performing:
if the history table in the destination location is a prefix of the history table from the source location:
enabling the replication process of the at least one of a plurality of data segments, and
if the history table in the destination location is not the prefix of the history table from the source location:
inhibiting the replication process of the at least one of a plurality of data segments.

16. A computer program product for protecting a plurality of data segments by a processor device, the computer program product comprising a non-transitory computer-readable storage medium having computer-readable program code portions stored therein, the computer-readable program code portions comprising:
an executable portion for, if an error occurs during a replication operation from a source location to a destination location causing at least one of a plurality of data segments to be deleted in the source location, performing:
executing a failback operation by a reverse replication process of the at least one of a plurality of data segments from the destination location to the source location, and
regaining ownership of the at least one of a plurality of data segments by the source location; and
an executable portion for, pursuant to the failback operation, performing:
enabling the reverse replication process if an owner of the at least one of a plurality of data segments is a designated one of the destination location, and
adding an invalid owner notification in a history table, wherein the failback operation is identified for the designated one of the at least one destination location.

17. The computer program product of claim 16, further including:
an executable portion for configuring the history table to accompany each of the plurality of data segments for consultation during the replication operation, wherein if the history table indicates an ownership conflict, the replication operation is inhibited; and
an executable portion for establishing an initial ownership of the plurality of data segments, including performing:
gaining ownership of a source location at the time of creation of the plurality of data segments,
setting an ownership attribute with an ownership identification (ID) of the at least one source location in a grid context for the plurality of data segments, and
listing the ownership ID of the plurality of data segments in the history table.

18. The computer program product of claim 17, further including an executable portion for, in conjunction with the replication operation, sending the history table from a source location to a destination location.

19. The computer program product of claim 17, further including an executable portion for, pursuant to a change of ownership of at least one of the plurality of data segments, performing:
waiving ownership of the at least one of the plurality of data segments for a source location,
gaining the ownership of the at least one of the plurality of data segments by a destination location, and
updating the ownership of the at least one of the plurality of data segments in the history table at both the source location and the destination location.

20. The computer program product of claim 17, further including an executable portion for, if ownership of at least one of the plurality of data segments is obtained by a first and second destination location:
identifying the ownership conflict between the first and second destination location,
sending an error notification of the ownership conflict,
preventing the replication operation of the at least one of the plurality of data segments from the second destination location to a third destination location, and
deleting the at least one of the plurality of data segments in the second destination location.

21. The computer program product of claim 17, further including an executable portion for, in conjunction with the replication operation, performing:
if the at least one of a plurality of data segments does not exist in a destination location:

replicating the at least one of a plurality of data segments to the destination location, and if the at least one of the plurality of cartridges does exist in the destination location:

comparing the history table in the destination location with the history table sent from a source location.

22. The computer program product of claim 21, further including an executable portion for, pursuant to the comparing the history table in the destination location with history table sent from the source location, performing:

if the history table in the destination location is a prefix of the history table from the source location:

enabling the replication process of the at least one of a plurality of data segments, and if the history table in the destination location is not the prefix of the history table from the source location:

inhibiting the replication process of the at least one of a plurality of data segments.

* * * * *